(12) United States Patent
Eshima et al.

(10) Patent No.: US 8,800,940 B2
(45) Date of Patent: Aug. 12, 2014

(54) CABLE CLAMP

(75) Inventors: Hirotaka Eshima, Hitachi (JP); Yoji Kobayashi, Hitachi (JP); Hideki Horikoshi, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 0 days.

(21) Appl. No.: 13/067,242

(22) Filed: May 18, 2011

(65) Prior Publication Data

US 2012/0112014 A1 May 10, 2012

(30) Foreign Application Priority Data

Nov. 4, 2010 (JP) ................................. 2010-247413

(51) Int. Cl.
*F16L 3/22* (2006.01)

(52) U.S. Cl.
USPC ............................ 248/74.3; 248/68.1; 248/62

(58) Field of Classification Search
USPC ........ 248/49, 62, 63, 64, 68.1, 69, 74.1, 74.3, 248/74.4
See application file for complete search history.

(56) References Cited

U.S. PATENT DOCUMENTS

| | | | |
|---|---|---|---|
| 1,089,642 A | 3/1914 | Honold | |
| 1,504,630 A | 8/1924 | Lilleberg | |
| 2,218,830 A | 10/1940 | Rose et al. | |
| 2,735,636 A * | 2/1956 | Snyder | 248/27.1 |
| 3,032,604 A | 5/1962 | Timmons | |
| 3,328,510 A | 6/1967 | White | |
| 3,800,062 A | 3/1974 | Kataoka et al. | |
| 4,179,774 A * | 12/1979 | Bradbury | 24/132 R |
| 4,374,299 A | 2/1983 | Kincaid | |
| 4,602,760 A * | 7/1986 | Tiefenbach et al. | 248/544 |
| 5,004,194 A * | 4/1991 | Watanabe | 248/74.5 |
| 5,035,383 A * | 7/1991 | Rainville | 248/68.1 |
| 5,073,126 A | 12/1991 | Kikuchi et al. | |
| 5,230,488 A | 7/1993 | Condon | |
| 5,284,110 A * | 2/1994 | Hostetler | 119/72 |
| 5,765,786 A * | 6/1998 | Gretz | 248/68.1 |

(Continued)

FOREIGN PATENT DOCUMENTS

| | | |
|---|---|---|
| JP | 53-27477 | 3/1978 |
| JP | 63-314114 A | 12/1988 |

(Continued)

OTHER PUBLICATIONS

Office Action dated Nov. 7, 2012 in U.S. Appl. No. 13/067,244.

(Continued)

*Primary Examiner* — Steven Marsh
(74) *Attorney, Agent, or Firm* — McGinn IP Law Group, PLLC

(57) ABSTRACT

A cable clamp includes a single metal plate shaped along an outer periphery of three cables that are triangularly arranged when viewed in cross-section, a mounting flange portion formed with both end portions of the metal plate overlapped each other, and a cable support member inserted between at least two of the three cables so as to support the at least two cables between itself and the metal plate. The cable support member is inserted between two horizontally arranged cables in a direction perpendicular to the horizontal direction as well as perpendicular to a longitudinal direction of the two horizontally arranged cables. The cable support member has a tapered shape on an end side in an insertion direction thereof for facilitating an insertion thereof into a gap between the two horizontally arranged cables.

20 Claims, 4 Drawing Sheets

(56) References Cited

U.S. PATENT DOCUMENTS

| | | | |
|---|---|---|---|
| D395,815 S * | 7/1998 | Walters et al. ............... D8/354 |
| 5,833,188 A * | 11/1998 | Studdiford et al. ...... 248/229.17 |
| 6,513,765 B2 * | 2/2003 | Griffin et al. ............... 248/68.1 |
| 6,943,300 B2 | 9/2005 | Ekeberg et al. |
| 7,293,746 B2 * | 11/2007 | Brundage .................. 248/68.1 |
| 7,490,630 B2 * | 2/2009 | Coupe ......................... 138/108 |
| 7,550,674 B2 | 6/2009 | Jean |
| 7,653,987 B2 | 2/2010 | Tokuda et al. |
| 8,033,512 B2 * | 10/2011 | Lien ............................. 248/74.5 |
| 2007/0234559 A1 | 10/2007 | Tokuda et al. |
| 2009/0016843 A1 | 1/2009 | Komsitsky et al. |
| 2009/0140108 A1 | 6/2009 | Faied |
| 2009/0294149 A1 | 12/2009 | Watanabe et al. |
| 2012/0112014 A1 | 5/2012 | Eshima et al. |
| 2012/0186845 A1 | 7/2012 | Eshima et al. |

FOREIGN PATENT DOCUMENTS

| | | |
|---|---|---|
| JP | 06-233437 A | 8/1994 |
| JP | 2007-031057 | 2/2007 |
| JP | 2007-053886 | 3/2007 |
| JP | 2007-276738 | 10/2007 |
| JP | 2008-148446 | 6/2008 |
| JP | 2009-138939 A | 6/2009 |

OTHER PUBLICATIONS

Office Action dated Dec. 11, 2013 in U.S. Appl. No. 13/200,922.
Office Action dated Apr. 11, 2013 in U.S. Appl. No. 13/067,244.
Office Action dated Apr. 16, 2013 in U.S. Appl. No. 13/200,922.
Office Action dated Nov. 7, 2012 in U.S. Appl. No. 13/200,922.
Japanese Office Action dated Feb. 18, 2014 with an English translation.

* cited by examiner

1 CABLE CLAMP
2 CABLE
3 METAL PLATE
4 MOUNTING FLANGE PORTION
5 CABLE SUPPORT MEMBER

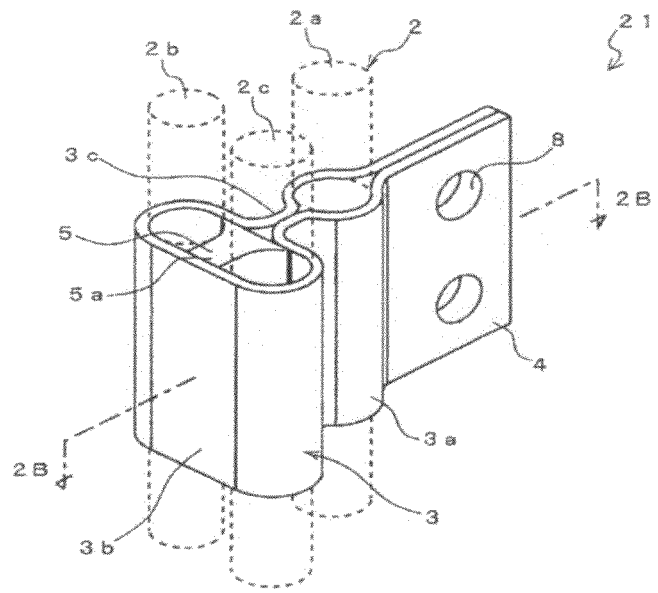
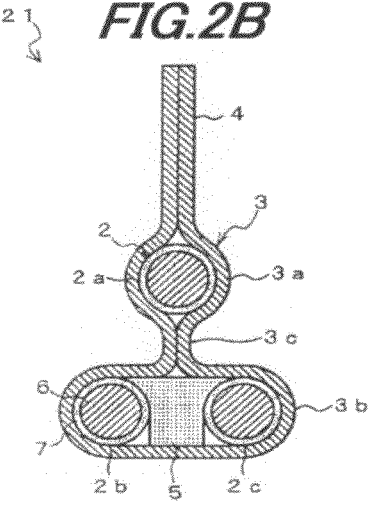
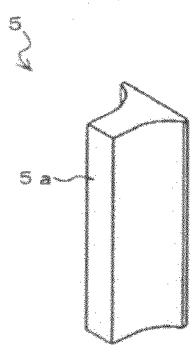

41 CABLE CLAMP
2 CABLE
3 METAL PLATE
4 MOUNTING FLANGE PORTION
42 CABLE SUPPORT MEMBER
43 RIB

CABLE CLAMP

The present application is based on Japanese Patent Application No. 2010-247413 filed on Nov. 4, 2010, the entire contents of which are incorporated herein by reference.

BACKGROUND OF THE INVENTION

1. Field of the Invention

The invention relates to a cable clamp used for fixing three cables to a structural body such as a car body, etc.

2. Related Art

For wiring three cable, it is necessary to fix the cables at a predetermined position. Various types of conventional cable clamps used therefor have been developed.

There are cable clamps of the type described in JP-A-2007-276738, JP-A-2007-31057 and JP-A-2007-53886, i.e., a linear type in which three cables are arrayed in a straight line when viewed in cross-section, or of the type described in JP-A-2008-148446, i.e., a triangular type in which three cables are triangularly-arrayed when viewed in cross-section.

The former, which is a linear type cable clamp, has a problem that a wiring space in an array direction of cables increases and a mounting space also increases since it is necessary to form two attaching portion at both ends in the array direction of the cable when, e.g., mounting on a car body, etc.

Accordingly, the inventors focused on the latter which is a triangular type cable clamp and considered that, as a result of the study, the triangular type cable clamp is effective not only in that saving of the mounting space can be realized since mounting to a car body, etc., can be achieved by one attaching portion but also in that cable arrangement in a triangular shape when viewed in cross-section contributes to realize saving of wiring space.

SUMMARY OF THE INVENTION

However, the cable clamp of JP-A-2008-148446 as a conventional triangular type cable clamp has following problems. The problems are significant especially when used on vehicle.

Since the cable clamp of JP-A-2008-148446 has a support metal fitting which has a two-piece structure, workability of cable wiring is poor due to assembly process of the support metal fitting.

In addition, the cable clamp of JP-A-2008-148446 requires to insert a cable through a cable insertion hole of a cable support member which is sandwiched and held by the support metal fitting, and thus, the workability of cable wiring is poor.

Furthermore, in the cable clamp of JP-A-2008-148446, the wiring space for the cable clamp as a cable fixing portion is large since the support metal fitting and the cable support member have a circular shape even though arrangement itself of three cables is triangular, hence, there is a room for improvement in space saving.

Meanwhile, vibration is a problem in a cable clamp for vehicle. In the cable clamp of JP-A-2008-148446, rotation of the cable support member with respect to the support metal fitting may be caused by vibration since the cable support member sandwiched and held by the support metal fitting is in a circular shape and it is not desirable in view of positioning of the cable.

Furthermore, since the cable clamp of JP-A-2008-148446 has a configuration in which the cable is inserted through the cable insertion hole of the cable support member, a gap (looseness) is generated between the cable support member and the cable, the cable is likely to be shifted with respect to the support metal fitting due to vibration and it is not desirable in view of positioning of the cable.

When the cable is not properly positioned, i.e., when the cable is not firmly fixed to the cable clamp, the cable is twisted and becomes easy to be broken by unnecessary force applied thereto and, in addition, wiring layout is changed from the intended layout due to the twist of the cable, which may result in failure caused by interference, etc., of the cable with surrounding members.

Accordingly, it is an object of the invention to provide a cable clamp that improves the workability in wiring cables, provides the space saving, and allows the firm fixation of the cables.

(1) According to one embodiment of the invention, a cable clamp comprises:

a single metal plate shaped along an outer periphery of three cables that are triangularly arranged when viewed in cross-section;

a mounting flange portion formed with both end portions of the metal plate overlapped each other; and a cable support member inserted between at least two of the three cables so as to support the at least two cables between itself and the metal plate, wherein the cable support member is inserted between two horizontally arranged cables in a direction perpendicular to the horizontal direction as well as perpendicular to a longitudinal direction of the two horizontally arranged cables, and the cable support member has a tapered shape on an end side in an insertion direction thereof for facilitating an insertion thereof into a gap between the two horizontally arranged cables.

In the above embodiment (1) of the invention, the following modifications and changes can be made.

(i) The cable support member is formed in a shape to contact all of the three cables and to support the three cables between the cable support member and the metal plate.

(ii) The cable clamp further comprises:

a deformation preventing rib extending from a surface of the mounting flange portion opposite to a mounting surface to the metal plate along the outer periphery of the three cables for preventing the deformation of the mounting flange portion.

(iii) The cable support member allows the at least two cables to be disposed to directly contact the metal pate such that the at least two cables are supported between the cable support member and the metal plate.

(iv) The cable support member allows the three cables to be disposed to directly contact the metal pate such that the three cables are supported between the cable support member and the metal plate.

Points of the Invention

According to one embodiment of the invention, a cable clamp is constructed such that a cable support member thereof is formed with a tapered shape on the end side in the insertion direction in order to facilitate the insertion of the cable support member into a gap between two cables, i.e., to facilitate the fixation of the cables to the cable clamp. Therefore, it is possible to improve the workability for wiring the cables in a structural body such as a vehicle etc.

In addition, the cable clamp is constructed such that the cables are supported between the cable support member and a metal plate formed along the periphery of the cables in order to firmly fix the cables to the metal plate. Therefore, it is possible to suppress the positional shift of the cables caused by vibration when the cable clamp is used on vehicle.

Furthermore, the cable clamp is constructed such that the metal plate is integrally formed without the separate structure in order not to require the assembly work as before. Therefore, it is possible to improve the workability for wiring the cables.

BRIEF DESCRIPTION OF THE DRAWINGS

Next, the present invention will be explained in more detail in conjunction with appended drawings, wherein:

FIGS. 1A to 1C are views showing a cable clamp in an embodiment of the invention, wherein FIG. 1A is a perspective view, FIG. 1B is a 1B-1B line cross-sectional view thereof and FIG. 1C is a perspective view of a cable support member;

FIGS. 2A to 2C are views showing a cable clamp in another embodiment of the invention, wherein FIG. 2A is a perspective view, FIG. 2B is a 2B-2B line cross-sectional view thereof and FIG. 2C is a perspective view of a cable support member;

FIGS. 3A to 3C are views showing a cable clamp in another embodiment of the invention, wherein FIG. 3A is a perspective view, FIG. 3B is a 3B-3B line cross-sectional view thereof and FIG. 3C is a perspective view of a cable support member; and FIGS. 4A to 4C are views showing a cable clamp in another embodiment of the invention, wherein FIG. 4A is a perspective view, FIG. 4B is a 4B-4B line cross-sectional view thereof and FIG. 4C is a perspective view of a cable support member.

DESCRIPTION OF THE PREFERRED EMBODIMENTS

A preferred embodiment of the invention will be described below in conjunction with the appended drawings.

Figure 1A:
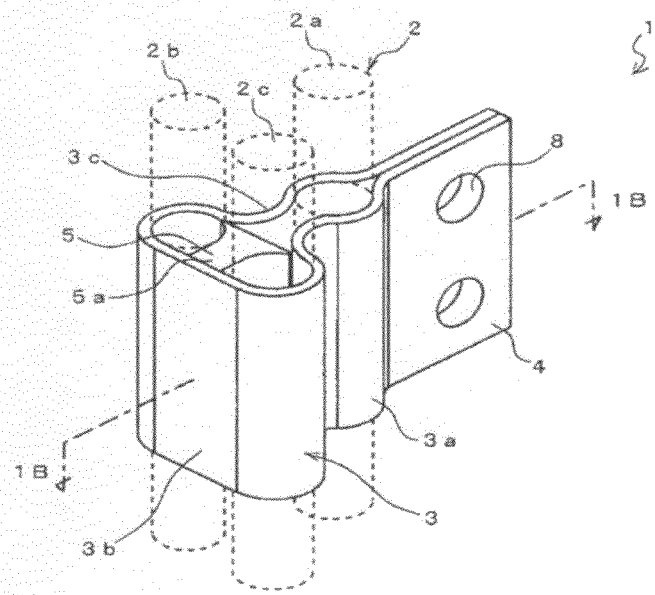
Figure 1B:
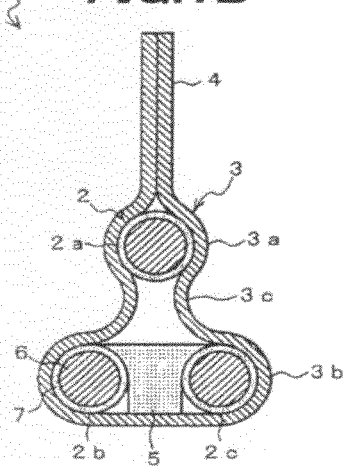
Figure 1C:
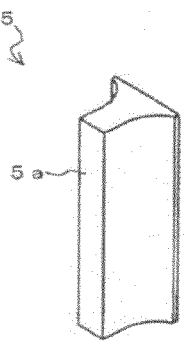

FIGS. 1A to 1C are views showing a cable clamp in the present embodiment, wherein FIG. 1A is a perspective view, FIG. 1B is a 1B-1B line cross-sectional view thereof and FIG. 1C is a perspective view of a cable support member.

As shown in FIGS. 1A to 1C, a cable clamp 1 is provided with a single metal plate 3 shaped along an outer periphery of three cables 2 which are triangularly arranged when viewed in cross-section, a mounting flange portion 4 formed overlapping both end portions of the metal plate 3 each other, and a cable support member 5 inserted between at least two of the three cables 2 so as to support the at least two cables 2 between itself and the metal plate 3.

The three cables 2 are to provide electrical power to, e.g., an in-wheel motor built-in a wheel, and the cable clamp 1 is used for, e.g., fixing the three cables 2 which extend from the in-wheel motor to a car body. Although each of the three cables 2 used here is composed of a center conductor 6 and an insulator 7 covering a periphery of the of the center conductor 6, it is not limited thereto and a cable provided with an outer conductor for shielding (i.e., a coaxial cable) may be used. In addition, the case of using three cables 2 having the same diameter will be explained here.

The metal plate 3 is in a strip shape, and has the mounting flange portion 4 composed of the both end portions of the metal plate 3 overlapped each other so as to have a plate-like shape, a first sandwiching-holding portion 3a formed on the proximal side of the mounting flange portion 4 to sandwich and hold a cable 2a (a cable on the upper side in FIG. 1B) which is one of the three cables 2 arranged triangularly when viewed in cross-section, and a second sandwiching-holding portion 3b formed on a side of the first sandwiching-holding portion 3a opposite to the mounting flange portion 4 to sandwich and hold remaining two cables 2b and 2c (two cables on the lower side in FIG. 1B).

The first sandwiching-holding portion 3a is formed along the outer periphery of the cable 2a so as to have a substantially circular shape when viewed in cross-section, and the second sandwiching-holding portion 3b is formed along the outer periphery of the cables 2b and 2c so as to have a substantially oval shape when viewed in cross-section (a shape composed of two parallel straight lines and two arc-shaped curved lines which connect end portions of the two straight lines). A necked portion 3c is formed between the two sandwiching-holding portions 3a and 3b so as to smoothly connect therebetween at the necked portion 3c. Here, a gap is formed in the both sides of the metal plate 3 which form the necked portion 3c, and a space for sandwiching and holding the cable 2a and a space for sandwiching and holding the cables 2b and 2c are communicated via the gap.

The mounting flange portion 4 is provided so as to extend from the first sandwiching-holding portion 3a toward the side opposite to the second sandwiching-holding portion 3b (upward in FIG. 1B), i.e., so as to protrude outward from a vertex of a triangle formed by the triangularly-arranged cables 2. It should be noted that the position of the mounting flange portion 4 is not limited thereto. For example, the mounting flange portion 4 may be provided so as to extend downward (downward in FIG. 1B) from the second sandwiching-holding portion 3b and appropriate changes can be made in accordance with a shape, etc., of the mounting space to where the cable clamp 1 is mounted.

Through-holes 8 for passing a fixing bolt (not shown) are formed on the mounting flange portion 4. A bolt is passed through the through-hole 8 and is then fixed to a structural body as a mounting target (a car body, etc.) using a nut, etc., thereby fixing the cable clamp 1 to the structural body as a mounting target.

In the present embodiment, the cable support member 5 is inserted between the two cables 2b and 2c which are supported by the second sandwiching-holding portion 3b, and thus, the two cables 2b and 2c are supported between the cable support member 5 and the metal plate 3.

The cable support member 5 is a substantially rectangular parallelepiped member formed to have a length substantially the same as the width of the metal plate 3 (a vertical length in FIG. 1A), and two side surfaces of the cable support member 5 in contact with the cables 2b and 2c are formed to be an arc-shaped curved surface along the outer periphery of the cables 2b and 2c. A width between the two side surfaces of the cable support member 5 (a width in a direction from front right to back left in FIG. 1A) is determined to be an appropriate width such that the two cables 2b and 2c are firmly fixed between the cable support member 5 and the metal plate 3 when the cable support member 5 is inserted between the two cables 2b and 2c. The cable support member 5 is formed of metal such as aluminum, resin or rubber.

In the cable clamp 1 of the present embodiment, the cable support member 5 is inserted between the two horizontally arranged cables 2b and 2c in a direction perpendicular to the horizontal direction as well as perpendicular to a longitudinal direction of the two horizontally arranged cables 2b and 2c. In other words, an insertion direction of the cable support member 5 is a direction from upside to downside in FIG. 1B. In the present embodiment, three cables 2 having the same diameter are used as described above, and thus, the two horizontally arranged cables 2b and 2c have the same diameter.

The cable support member 5 has a tapered shape on the end side in the insertion direction thereof (front left side in FIG.

1C) in order to facilitate insertion between the two cables 2b and 2c. The case where the entire cable support member 5 is formed in a shape tapered toward the end side in the insertion direction is described here.

An end portion 5a of the cable support member 5 formed in a tapered shape is formed to have a width (a horizontal width in FIG. 1B) substantially equal to the distance between the cables 2b and 2c, and a portion of the cable support member 5 posterior to the end portion 5a (rearward in the insertion direction, upper side in FIG. 1B) is formed in a shape along the outer periphery of the cables 2b and 2c. Although the case where the end portion 5a of the cable support member 5 is formed to have a constant width is shown here, a chamfering process or a rounding process may be performed on the end portion 5a of the cable support member 5, or, the end portion 5a of the cable support member 5 may be formed to have a tapered shape so that the width is gradually reduced toward the end side in the insertion direction. This allows easier insertion between the two cables 2b and 2c. In this regard, however, when the chamfering process or the rounding process is performed on the end portion 5a of the cable support member 5 or when the end portion 5a is formed in a tapered shape, the processed portion is desirably formed below the central axis of the two cables 2b and 2c. This is because, if the processed portion is formed above the central axis of the two cables 2b and 2c, the contact area between the cable support member 5 and the cables 2b, 2c is reduced and it may not be possible to firmly hold the cables 2b and 2c.

For fixing the three cables 2a to 2c to the cable clamp 1, firstly, in the state that the both end portions of the metal plate 3 (i.e., the mounting flange portion 4) are opened, the cables 2b and 2c are housed in the second sandwiching-holding portion 3b by being inserted through the opening, and after the housing, the cable support member 5 is inserted between the cables 2b and 2c. Then, the cable 2a is housed in the first sandwiching-holding portion 3a and the both end portions of the metal plate 3 (the mounting flange portion 4) are closed in this state.

That is, the embodiment enables the insertion of the cable support member 5 even after arranging the two cables 2b and 2c at a predetermined position in the second sandwiching-holding portion 3b of the metal plate 3. This procedure can be conducted, as employed in the embodiment, only by tapering the end side of the cable support member 5. Here, if the tapered shape is not employed, the cable support member 5 must have a line-symmetric shape with respect to the vertical direction in FIG. 1B and this shape does not allow the above-mentioned procedure to be used. Therefore, it is necessary to collectively assemble the two cables 2b and 2c and the cable support member 5 each of which is a separate component and to subsequently arrange the assembled two cables 2b and 2c and cable support member 5 at a predetermined position in the second sandwiching-holding portion 3b of the metal plate 3.

This requires to widely open the both end portions of the metal plate 3 (a largely opened state) in order to arrange the assembled two cables 2b and 2c and cable support member 5 in the second sandwiching-holding portion 3b of the metal plate 3, and considering that the both end portions of the metal plate 3 are eventually pulled together and closed, there is a problem that the process of pulling together the widely opened both end portions of the metal plate 3 results in that the cables 2b and 2c are shifted and the workability is poor. This problem is significant when the cable clamp 1 is arranged in the vertical direction as shown in FIG. 1A.

By contrast, in the embodiment, since it is possible to insert the cable support member 5 even after arranging the two cables 2b and 2c at a predetermined position in the second sandwiching-holding portion 3b of the metal plate 3, the opening between the both end portions of the metal plate 3 can be small. This results in obtaining an effect of facilitating work. In other words, it is possible to improve the workability.

Getting back to the previous subject, when the both end portions of the metal plate 3 (the mounting flange portion 4) are closed, the metal plate 3 is deformed such that the space in the second sandwiching-holding portion 3b is narrowed. Therefore, the cables 2b and 2c and the cable support member 5 are sandwiched and held by the second sandwiching-holding portion 3b and the cables 2b and 2c are firmly fixed to the metal plate 3. Likewise, the cable 2a is sandwiched and held by the first sandwiching-holding portion 3a and is firmly fixed to the metal plate 3. By tightening a bolt which is inserted into the through-hole 8, it is possible to fix the cable clamp 1 to a structural body as a mounting target and, at the same time, to close the both end portions of the metal plate 3 (the mounting flange portion 4).

Effects of the Embodiment

The effects of the embodiment will be described below.

The cable clamp 1 of the present embodiment is provided with the single metal plate 3 shaped along the outer periphery of the three cables 2 which are triangularly arranged when viewed in cross-section, the mounting flange portion 4 formed overlapping the both end portions of the metal plate 3 each other, and the cable support member 5 inserted between the cables 2b and 2c so as to support the cables 2b and 2c between itself and the metal plate 3, and the cable support member 5 is formed to have a tapered shape on the end side in the insertion direction thereof.

By forming the cable support member 5 to have a tapered shape on the end side in the insertion direction thereof, work to insert the cable support member 5 between the cables 2b and 2c is facilitated, and thus, the work to fix the three cables 2 to the cable clamp 1 is facilitated. Therefore, it is possible to improve workability at the time of wiring the cables 2.

In addition, since the cable clamp 1 is configured to insert the cable support member 5 between the cables 2b and 2c so that the cables 2b and 2c are supported between the cable support member 5 and the metal plate 3, it is possible to firmly fix the cables 2b and 2c to the metal plate 3. Therefore, it is possible to suppress the positional shift of the cables 2b and 2c caused by vibration even when the cable clamp 1 is used on vehicle.

Meanwhile, directly sandwiching and holding the cables 2b and 2c by the second sandwiching-holding portion 3b without using the cable support member 5 may be an alternative, however, there is a possibility that the cables 2b and 2c are excessively deformed in this case, and this deformation may causes breakage of the cables 2b and 2c or deterioration in electrical characteristics of the cables 2b and 2c.

In addition, when the cable 2 is fixed only by the metal plate 3, the metal plate 3 may be deformed or the cable 2 may not be firmly fixed due to defective process of the metal plate 3. However, since the cable clamp 1 of the invention allows firmer fixation of the cables 2b and 2c by using the cable support member 5, the shape can be maintained and the cables 2 can be firmly fixed even if deformation of the metal plate 3 due to external force occurs or the metal plate 3 is defectively processed. Therefore, it is possible to improve reliability.

Furthermore, since the cable clamp 1 is configured to sandwich and hold the cables 2b and 2c by the cable support member 5 and the metal plate 3, looseness is not generated around the cable, unlike the conventional cable clamp which requires insertion of a cable through a cable insertion hole of a cable support member. Therefore, it is possible to firmly fix and position the cables 2b and 2c. In addition, since there is no need of the work to insert a cable through a cable insertion hole which is conventionally required, it is possible to improve the workability at the time of wiring the cables 2.

Furthermore, the cable clamp 1 does not require a conventional assembly work since the metal plate 3 does not have a separable structure, and it is thus possible to improve the workability at the time of wiring the cables 2.

Still further, in the cable clamp 1, since the metal plate 3 is shaped along the outer periphery of the three cables 2 which are triangularly arranged when viewed in cross-section, it is possible to downsize the entire cable clamp 1 and thus to reduce the wiring space for the cable clamp 1, thereby contributing to the space saving. In addition, since the rotation of the cable support member 5 due to vibration does not occur, it is possible to firmly fix and position the cables 2b and 2c.

Other Embodiments

The other embodiments of the invention will be described below.

A cable clamp 21 shown in FIGS. 2A to 2C basically has the same configuration as the cable clamp 1 of FIG. 1, except that a gap is not formed in the both sides of the metal plate 3 which form the necked portion 3c in order to separate the space for sandwiching and holding the cable 2a from the space for sandwiching and holding the cables 2b and 2c. The same effect as the above-mentioned cable clamp 1 can be obtained even though the space for sandwiching and holding the cable 2a is separated from the space for sandwiching and holding the cables 2b and 2c by the necked portion 3c.

Figure 3A:
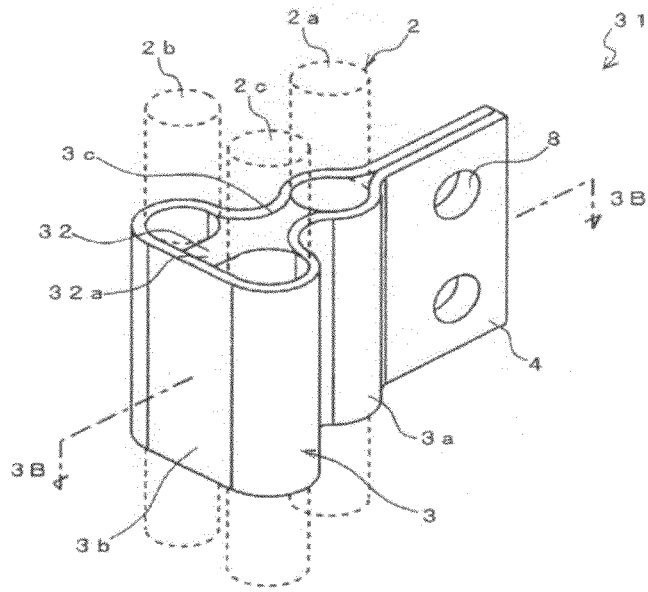
Figure 3B:
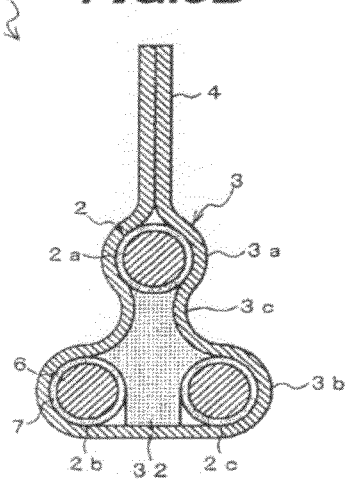
Figure 3C:
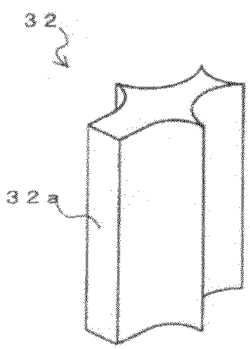

A cable clamp 31 shown in FIGS. 3A to 3C basically has the same configuration as the cable clamp 1 of FIG. 1, except that a cable support member 32 is used.

The cable support member 32 is formed in a shape being in contact with all of the three cables 2a to 2c and is configured to support the three cables 2a to 2c between itself and the metal plate 3. In detail, similarly to the cable support member 5 used in the cable clamp 1 of FIG. 1, the cable support member 32 has a tapered shape on the end side in the insertion direction thereof, the tapered end portion 32a is formed so as to have a width substantially equal to the distance between the cables 2b and 2c, and a portion of the cable support member 32 posterior to the end portion 32a (rearward in the insertion direction, upper side in FIG. 3B) is formed in a shape along the outer periphery of the three cables 2a to 2c as well as along an inner surface of the metal plate 3 (i.e., a shape which fills the space within the three cables 2a to 2c). The cable clamp 31 allows firm fixation of all of the three cables 2a to 2c to the metal plate 3 by using the cable support member 32.

Figure 4A:
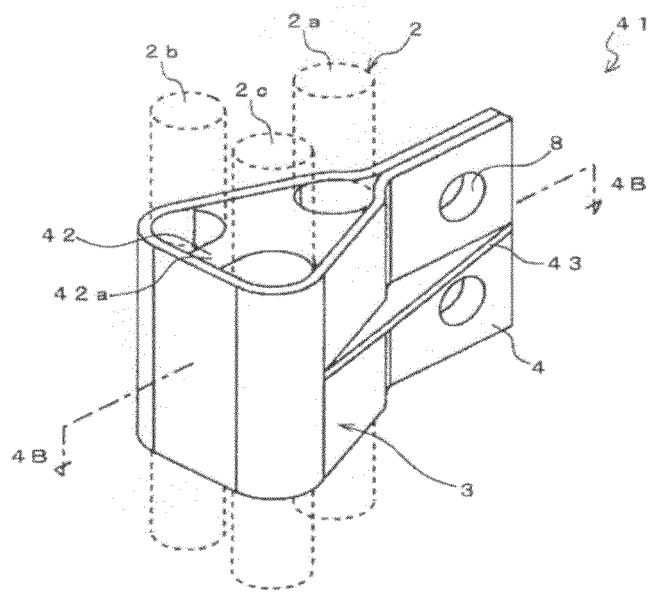
Figure 4B:
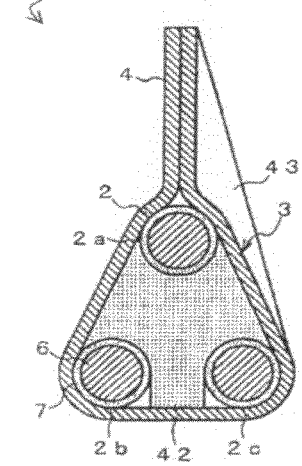
Figure 4C:
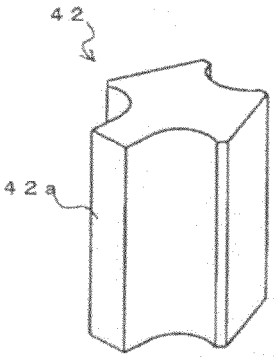

A cable clamp 41 shown in FIGS. 4A to 4C is the same as the cable clamp 31 of FIG. 3, except that the metal plate 3 is formed in a substantially triangle shape when viewed in cross-section. Similarly to the above-mentioned cable support member 32, a cable support member 42 used in the cable clamp 41 has a tapered shape on the end side in an insertion direction thereof and the tapered end portion 42a is formed so as to have a width substantially equal to the distance between the cables 2b and 2c, and a portion of the cable support member 42 posterior to the end portion 42a (rearward in the insertion direction, upper side in FIG. 4B) is formed in a shape along the outer periphery of the three cables 2a to 2c as well as along the inner surface of the metal plate 3.

Meanwhile, in the cable clamp 41, a deformation preventing rib 43 is formed so as to extend from a surface of the mounting flange portion 4 opposite to a mounting surface, i.e., from a surface on a side where a head of a bolt is located when the bolt is attached (a front right surface in FIG. 4A) to the metal plate 3 along the outer periphery of the three cables 2a to 2c. The deformation preventing rib 43 is to prevent deformation of the mounting flange portion 4, and is formed so as to extend perpendicular to the mounting flange portion 4. Note that, although it is not mentioned for the above-mentioned cable clamps 1, 21 and 31 of FIGS. 1 to 3, it is possible to form the deformation preventing rib 43 in the cable clamps 1, 21 and 31 in order to prevent deformation of the mounting flange portion 4.

It should be noted that the present invention is not intended to be limited to the above-mentioned embodiments, and it is obvious that the various kinds of changes can be added without departing from the gist of the present invention.

For example, although the case of using the three cables 2 having the same diameter has been described in the above-mentioned embodiment, three cables 2 having different diameters may be used. In addition, the invention is obviously applicable to the case where two cables 2b and 2c used have different diameters.

What is claimed is:

1. A cable clamp, comprising:
   a single metal plate shaped along an outer periphery of three cables that are triangularly arranged when viewed in cross-section;
   a mounting flange portion formed by both end portions of the metal plate being overlapped together; and
   a cable support member inserted between at least two horizontally arranged cables of the three cables so as to support the at least two cables between itself and the metal plate,
   wherein the single metal plate comprises a first sandwiching-holding portion for sandwiching and holding the at least two cables in a horizontally-spaced state with two arc-shaped portions formed to include two arcs when viewed in a cross section prior to sandwiching and holding the at least two cables,
   wherein the mounting flange portion is formed in a substantially perpendicular direction to a horizontal direction of the two horizontally arranged cables, the perpendicular direction of an extension of the mounting flange portion extending along a line that crosses with a line that connects central axes of the two horizontally arranged cables,
   wherein the cable support member is inserted with the mounting flange portion being opened, from an opening of the mounting flange portion, between the two horizontally arranged cables housed in the two arc-shaped portions respectively and held with a space horizontally by the first sandwiching-holding portion, and in a direction perpendicular to a horizontal direction and perpendicular to a longitudinal direction of the two horizontally arranged cables,
   wherein the cable support member has a tapered shape on an end side in an insertion direction thereof for facilitating an insertion thereof between the two horizontally arranged cables,
   wherein the single metal plate further comprises a second sandwiching-holding portion for sandwiching and holding one cable of the three cables, which is not housed in the two arc-shaped portions of the three cables, and
   wherein the first sandwiching-holding portion is formed along an outer periphery of the one cable to have a substantially circular shape when viewed in the cross-section.

2. The cable clamp according to claim 1, wherein the cable support member is formed in a shape to contact all of the three cables and to support the three cables between the cable support member and the metal plate.

3. The cable clamp according to claim 1, further comprising:
   a deformation preventing rib extending from a surface of the mounting flange portion opposite to a mounting surface to the metal plate along the outer periphery of the three cables for preventing a deformation of the mounting flange portion.

4. The cable clamp according to claim 1, wherein the cable support member allows the at least two cables to be disposed to directly contact the metal plate such that the at least two cables are supported between the cable support member and the metal plate.

5. The cable clamp according to claim 2, wherein the cable support member allows the three cables to be disposed to directly contact the metal plate such that the three cables are supported between the cable support member and the metal plate.

6. The cable clamp according to claim 1, wherein the cable support member is inserted between the three cables such that the cable support member spaces apart the at least two cables from a third cable of the three cables.

7. The cable clamp according to claim 1, wherein surfaces of said both end portions of the metal plate contact each other to form a plate-like shape.

8. The cable clamp according to claim 1, wherein a length of the cable support member is a same as a width of the metal plate.

9. The cable clamp according to claim 1, wherein the cable support member is tapered from another end side of the cable support member to the end side of the cable support member in the insertion direction.

10. The cable clamp according to claim 1, wherein one side surface of the cable support member has a width equal to a distance between the at least two cables.

11. The cable clamp according to claim 1, wherein the insertion direction of the cable support member is between central axes of the at least two cables.

12. The cable clamp according to claim 1, wherein the cable support member is insertable between the at least two cables after arranging the at least two cables at fixed positions.

13. The cable clamp according to claim 1, further comprising:
   a deformation preventing rib extending perpendicular to the mounting flange portion along the outer periphery of the three cables.

14. The cable clamp according to claim 13, wherein the deformation preventing rib extends from an edge of the mounting flange portion to a corner of the metal plate.

15. The cable clamp according to claim 1, wherein the cable support member is continuously tapered from another end side of the cable support member to the end side of the cable support member in the insertion direction.

16. The cable clamp according to claim 1, wherein the end side of the cable support member contacts the metal plate.

17. The cable clamp according to claim 1, wherein the mounting flange portion is arranged within a space formed between two parallel planes respectively extending in the insertion direction through each of the central axes of the two horizontally arranged cables.

18. The cable clamp according to claim 1, wherein the mounting flange portion protrudes outward from a vertex of a triangle formed by the three cables that are triangularly arranged.

19. The cable clamp according to claim 1, wherein the line that crosses with the line that connects the central axes of the two horizontally arranged cables extends in an overlapped area of the end portions of the metal plate.

20. The cable clamp according to claim 19, wherein the line that crosses with the line that connects the central axes of the two horizontally arranged cables passes through a center of one of the three cables.

* * * * *